United States Patent [19]

Hall et al.

[11] 4,236,325
[45] Dec. 2, 1980

[54] SIMULATOR CONTROL LOADING INERTIA COMPENSATOR

[75] Inventors: John D. Hall, Johnson City; Alfred S. Williams, Jr., Binghamton, both of N.Y.

[73] Assignee: The Singer Company, Binghamton, N.Y.

[21] Appl. No.: 973,428

[22] Filed: Dec. 26, 1978

[51] Int. Cl.³ .............................................. G09B 9/08
[52] U.S. Cl. ...................................................... 434/45
[58] Field of Search .................. 35/12 S, 12 W, 12 K; 244/83 D

[56] References Cited

U.S. PATENT DOCUMENTS

| | | | |
|---|---|---|---|
| 2,804,698 | 9/1957 | Grandmont | 35/12 S |
| 3,063,160 | 11/1962 | Hemstreet | 35/12 S |
| 3,220,121 | 11/1965 | Cutler | 35/12 S |
| 3,463,866 | 8/1969 | Staples | 35/12 S |
| 3,478,990 | 11/1969 | Kaniuka | 244/83 D |
| 3,733,039 | 5/1973 | O'Connor et al. | 244/83 D |

*Primary Examiner*—Vance Y. Hum
*Attorney, Agent, or Firm*—J. Dennis Moore; Richard J. Paciulan; Jeff Rothenberg

[57] ABSTRACT

Signals are developed representative of the mechanical inertia of a vehicle simulator linkage elements that drive control members utilized by a student operator. These signals are combined with signals representative of programmed vehicle operating data and signals representative of the student operator's mechanical input such that the mechanical inertia of the simulator linkage elements does not influence the signal which causes the actual operator control member to have an appropriate force/"feel".

2 Claims, 3 Drawing Figures

SIMULATOR CONTROL LOADING INERTIA COMPENSATOR

The Government has rights in this invention pursuant to contract number F33657-74-C-0322 awarded by the Department of the Air Force.

DESCRIPTION

Technical Field

This invention relates to a vehicle simulator control loading system, and more particularly to an improved system which compensates for mechanical inertia such that system stability is maintained even for control loading systems demanding high frequency response.

Background Art

Use of a vehicle simulator is a modern, well-known method of training personnel. In an aircraft simulator, for example, the trainee is placed in a realistically recreated aircraft environment designed such that the trainee feels he is in and operating an actual aircraft without leaving the ground. An important element used to create this realism is the control loading system which develops forces and "feel" of the aircraft's primary controls. Many training judgements depend on the student's response to these forces and "feel".

During flight operation the pilot, for instance, must control his ailerons, elevator, and rudder to maneuver his aircraft. He typically holds a conventional control stick to control the elevator and the aileron systems while stepping on foot pedals to operate the rudder system. To effectively simulate these primary controls which come in contact with the pilot's body, forces must be applied to the control stick and pedals in response to both forces developed by the aircraft's aerodynamics, such as airloads or spring forces, and forces applied to the controls by the trainee pilot. The pilot must "feel" the effects of his actions as communicated through these forces applied to these controls. For instance, as the pilot moves his control stick to maneuver his aircraft, he must feel resistance in his hand, simulating the actual resistance that a pilot flying an actual aircraft would sense.

Aircraft simulators use feedback networks to help produce this force/"feel" sensed by the pilot. A computer typically develops force requirements that must be transmitted to the controls as a function of the aircraft's aerodynamic loading during flight and internal system characteristics inherent to the particular aircraft being simulated. The Computer electrically causes hydraulic and mechanical devices to be activated so that appropriate forces are applied to the physical controls. Feedback systems sense the mechanical status of the device upon which the forces are being applied. The computer, having received the feedback information, compares the information with new requirements as they are developed, such as new aerodynamic loading situations. The computer then causes new required forces to be developed.

Many simulators employ an amplifier-controlled servo valve which produces variable amounts of kinetic energy in the form of hydraulic fluid flow in response to variable amounts of electrical energy incident upon the amplifier. The fluid applies pressure to mechanical actuators which in turn apply forces to the primary controls by mechanical linkage elements. These various simulator mechanical elements, such as servo valves, mechanical actuators, and other mechanical linkages, each of which are part of the simulator complex not interfacing directly with the pilot-trainee, are necessary to convert the pilot's input motions into signals usable in conjunction with the computer. The computer in turn causes the necessary mechanical/physical responses to be provided to the pilot.

In order to properly develop the frequency response that an actual aircraft would have, the total inertia of the simulated system, namely the combined mechanical inertia and electrical inertia, must be less than or equal to the total aircraft inertia. The prior art shows that the simulated inertia can be scaled upward or downward by reducing the elements of the mechanical system, namely, by eliminating as much as possible the mechanical mass interfacing the actual aircraft equipment employed by the trainee-pilot and the simulator electronics.

One common prior art control loading system is disclosed in U.S. Pat. No. 3,463,866 issued to L. A. Staples. Staples provides a flight simulator control loading system wherein a mathematical model of the aircraft controls is implemented. Staples teaches a method for overcoming the stability problems of other prior art control loading systems. He states that a flight simulator control loading system which implements a servo force loop rather than a servo position loop will provide excellent stability since the simulated inertia introduced into the servo force loop can easily be maintained greater than the minimum value needed throughout the remaining portions of the system.

However, prior art simulator control loading systems needed only to provide a low frequency response. This was primarily a result of the fact that the simulator mechanical linkage element inertia was much less than the actual aircraft inertia. This being the case, the electronic inertia, when combined with the relatively minor simulator mechanical linkage element inertia, could easily be varied and simulate the actual inertia on its own. However, many high performance fighter-type aircraft have very high frequency response systems with very low inertia. In these high frequency response systems most of the inertia is confined to the actual control member being operated. When the actual aircraft inertia approaches the value of the electronic inertia, mechanical inertia must be negligible in order to have a stable system. A mechanical linkage element reduction as taught by Staples becomes all but impossible in high frequency response systems because any significant decrease in mechanical elements can cause strength problems or would be prohibitively expensive if exotic lightweight/high strength materials were to be employed. Therefore, the need exists for a simple method of compensating for mechanical inertia in simulator control loading systems where high frequency responses are required.

DISCLOSURE OF INVENTION

It is therefore a principal object of the present invention to provide an improved simple apparatus and technique that compensates for the effect of mechanical inertia in simulator linkage elements that drive control members utilized by the operator.

It is another object of the present invention to compensate for simulator mechanical inertia without losing simulator strength or reliability.

According to the present invention, signals are developed representative of the inertia force of the simulator linkage elements. These signals are combined with signals representative of programmed vehicle operating data and signals representative of the simulator operator's physical input such that the mechanical inertia of the simulator does not influence the signal which causes the actual operator control member to have an appropriate force/"feel".

The foregoing and other features and advantages will become more apparent in light of the following description of the present invention as illustrated in the accompanying drawings.

DETAILED DESCRIPTION

Figure 1:
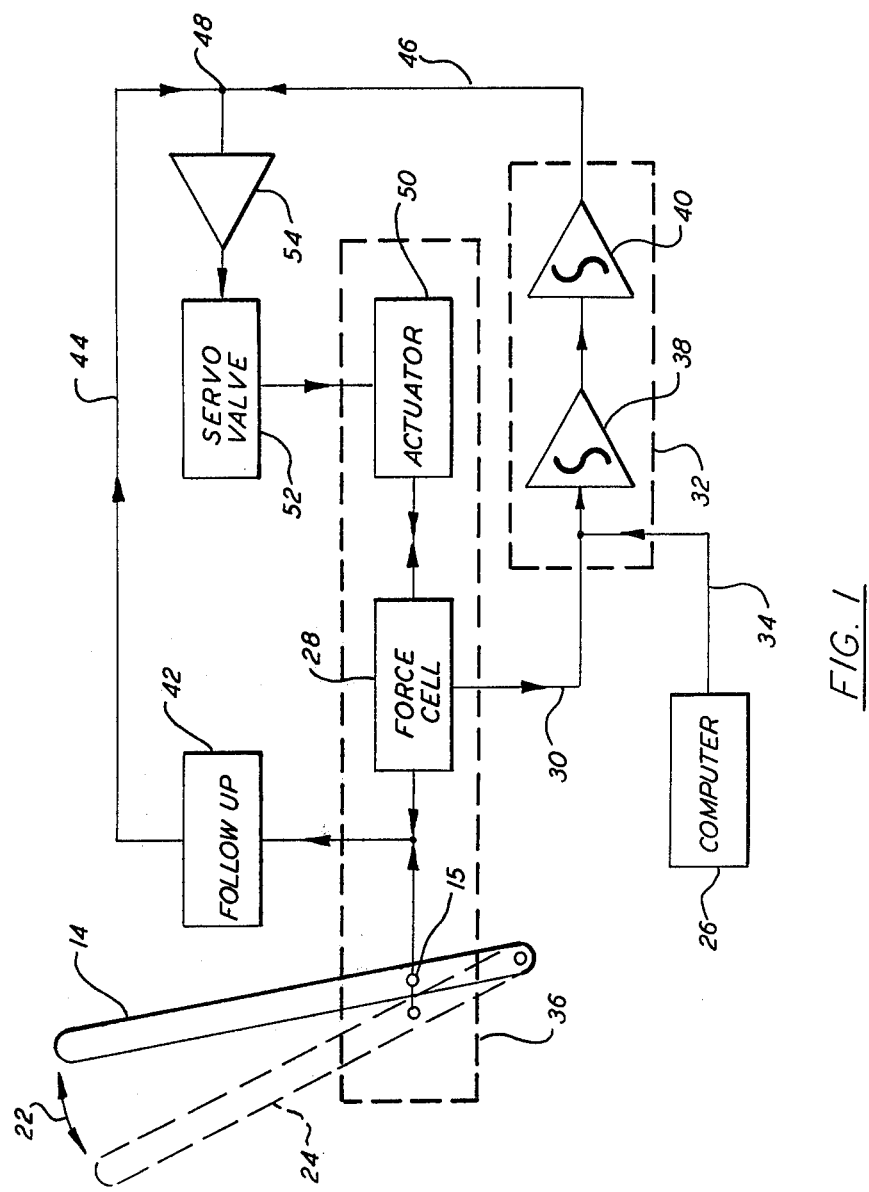
FIG. 1 is a block diagram of a typical feedback control system employed in an aircraft simulator.

Referring to FIG. 1, a block diagram of a typical feedback control system employed in an aircraft simulator is shown. A control stick 14 is shown schematically as being capable of motion through an angle 22 and coming to rest in some position 24. The pilot-trainee mechanically applies a force to stick 14 to "fly" his simulator. To create the correct force/"feel" as sensed by the pilot, computer 26 determines forces required to be applied to stick 14. When a correct force is applied to stick 14 the stick will actually be driven by a computer controlled servo allowing the pilot to feel the appropriate force on his hand as though he were actually moving the control stick. Consider for the time being that the pilot while holding the stick is not applying any forces to the stick and the only simulated forces that the stick receives are those due to aircraft mechanics and aerodynamic loading. If the computer determines that the stick must move through some angle 22, forces must be applied to the stick. Force cell 28 determines forces present on the mechanical system and converts the mechanical force values into electrical values and feeds these electrical values by some line 30 to command circuit 32. Computer 26 likewise feeds to command circuit 32 by line 34 electrical values of the force required. Since the mass of the mechanical system 36 is a known quantity, mechanical system acceleration (where acceleration = force/mass) can be converted into a position value by double integration. A difference in force values from force cell 28 and computer 26 becomes an acceleration difference value and integrator 38 converts acceleration into velocity while integrator 40 converts velocity into position. Follow-up potentiometer 42 converts the actual position location of stick 14 into an electrical signal which is fed back along line 44. The follow-up signal is compared with the position signal of integrator 40 which is fed along line 46. The position signal difference is developed at junction 48, electrically determining the necessary relationship required to move stick 14 from its present position to position 24 as required by computer 26. Actuator 50 must mechanically cause stick 14 to be driven to this new position. Actuator 50 is driven by servo valve 52 which allows kinetic energy in the form of hydraulic fluid to press against actuator 50. The amount of fluid flow incident upon actuator 50 is controlled by the magnitude of voltage applied to electrical terminals of servo valve 52. Servo amplifier 54 presents to servo valve 52 the signal required to drive the actuator as determined by the difference signal present at junction 48. Actuator 50 then applies the required force through force cell 28 to stick 14 at junction 15 and stick 14 would then move to new position 24. Since the pilot is not applying any of his own forces, his hand would feel forces as the stick moves to position 24. If the pilot were applying his own force, the force cell would combine the pilot force with the existing mechanical system force and then supply a composite force signal for comparison in command circuit 32 with the computer signal.

When viewing FIG. 1 from an inertia standpoint, mechanical system 36 plus the remaining electrical system inertia completing the electrical-mechanical feedback loop must equal the actual aircraft inertia. It can be seen that the actual control stick, force cell, and actuator, all have mass and all provide mechanical inertia. In other words, when a force is applied to the stick and a signal representative of the motion of the stick is provided to the electronics, the mass of the force cell and actuator can retard the true applied forces, namely, those of the pilot and his control stick. Therefore, the signal applied to command circuit 32 would not only reflect the forces of the actual aircraft and those applied by the pilot but also the forces attributed to simulator mechanical element inertia. According to the present invention, the effect of the mechanical inertia of the simulator linkage elements is compensated for and the electronic inertia becomes the governing inertia in providing the frequency response demanded by the pilot/-trainee. This is particularly important for high frequency low inertia systems when high performance fighter-type aircraft are simulated. Low inertia systems can therefore easily be simulated when mechanical inertia is no longer a problem.

Figure 2:
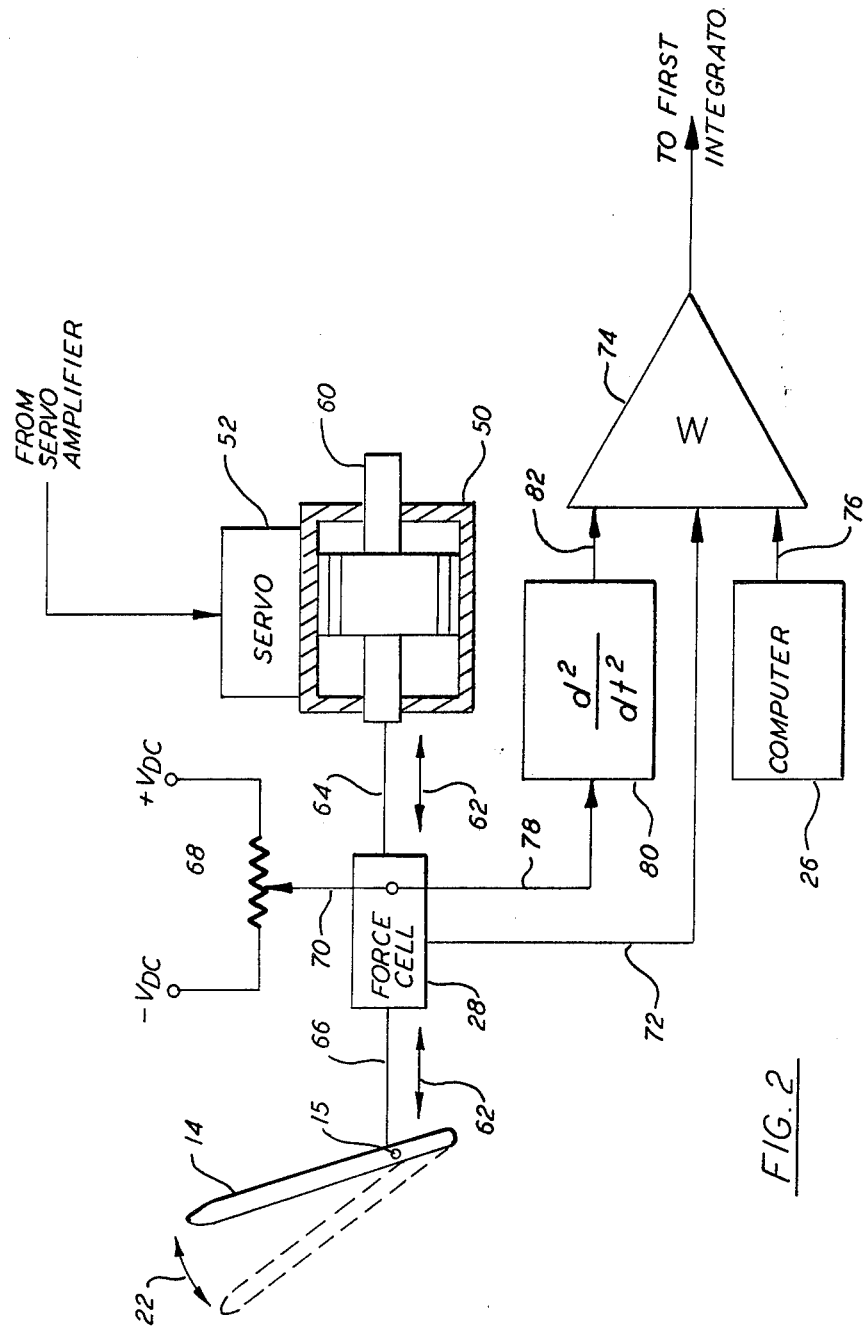
FIG. 2 is a block diagram of one aspect of the preferred embodiment of the present invention.

Referring to FIG. 2, a portion of the preferred embodiment of the present invention is shown. As previously described in conjunction with FIG. 1, stick 14, which can move through angle 22, is connected to force cell 28 at mechanical junction 15. Actuator 50, shown here as containing a plunger 60, is connected to force cell 28 and is driven by servo valve 52 which is activated by servo amplifier signals, not shown. When a response must be provided to the control stick, plunger 60 is driven along an appropriate direction 62. Since the plunger is to drive the stick, it must be connected by some mechanical lines or linkage to the stick. Lines 64 and 66 are shown schematically interconnecting control stick 14, force cell 28, and plunger 60. For simplicity of description, the plunger 60, force cell 28, and stick junction 15 are connected in a straight line. Therefore, lines 64 and 66, and force cell 28 will also move along direction 62. Of course, one skilled in the art could readily practice the invention using more complex mechanical interconnections and drive linkages.

To compensate for the mechanical inertia introduced by simulator components such as lines 64 and 66, force cell 28, and plunger 60, the movement of these interconnected elements is determined. Potentiometer 68 has its wiper arm 70 affixed to force cell 28 such that any plunger/force cell/linkage movement along direction 62 will change the wiper arm location on potentiometer 68. Appropriate voltages are applied to the potentiometer terminals, such as a positive DC potential applied to one terminal and a negative DC potential applied to the second terminal. A voltage will be then produced at wiper arm 70 representative of relative position of the plunger-to-stick mechanical system.

As previously described referring to FIG. 1, force cell 28 can sense forces acting on the control member and converts these forces into electrical values. Computer 26 develops signals representative of forces derived from known aircraft data such as aerodynamic loading, spring tension, and auto pilot forces, for example. However, instead of feeding force cell signals and computer signals directly into the first integrator 38 of FIG. 1, force cell signals are fed along line 72 to summing amplifier 74 while the computer signals are fed along lines 76, also into summing amplifier 74. Since the signal on wiper arm 70 is representative of distance traveled, and F=MA (force=mass times acceleration, where acceleration=second derivative of distance) a double differentiation circuit can convert the distance signal to a force signal by merely knowing the mass of a moving system, a fixed known quantity. The wiper arm signal is therefore fed by line 78 to an input of double differentiator 80 which in turn provides an output force signal which is fed along line 82 also to summing amplifier 74. Circuitry of summing amplifiers are well known in the art and can cause the force signal to be subtracted from the signal arriving from force cell 28. This will in essence electronically compensate for the effect of the simulator mechanical inertia from signals to be fed to the integrators and, in turn, from signals driving the servo system. The servo will not be effected by the simulator linkage elements and the feedback force loop will therefore respond with the same high frequency as would occur in a high performance aircraft being simulated.

Figure 3:
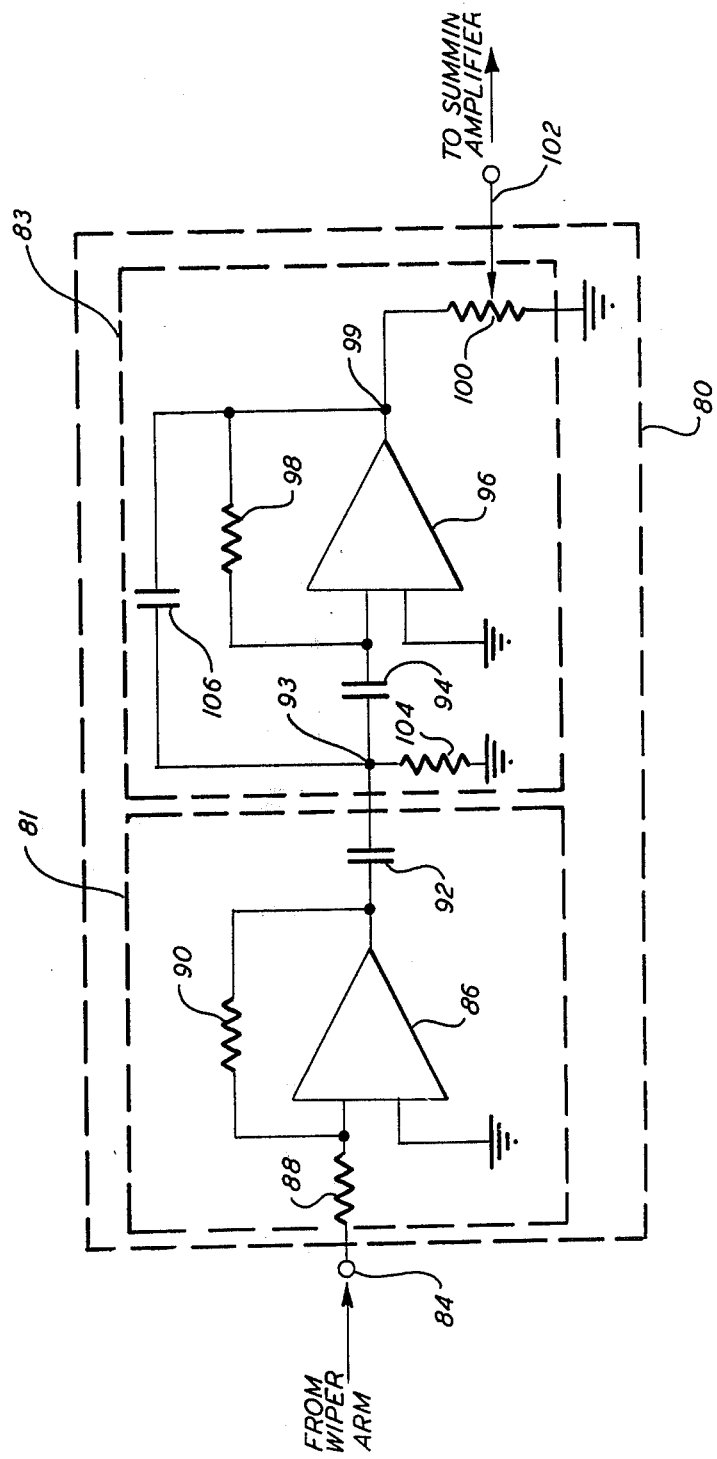
FIG. 3 is a schematic diagram of another aspect of the preferred embodiment of the present invention.

In FIG. 3 a preferred embodiment of the double differentation circuit 80 is shown. Circuit 80 consists of two differentiation circuits, 81 and 83, connected in series. The signal from the potentiometer wiper arm is input to circuit 81 at junction 84. Amplifier 86 having a gain determined by resistors 88 and 90 buffers the potentiometer so as not to draw excessive current from the potentiometer. Capacitor 92 differentiates the signal output from amplifier 86 and provides a signal representative of velocity at junction 93. Capacitor 94 of circuit 83 provides a second differentiation. Amplifier 96, with gain controlled by resistor 98, amplifies the double differentiated signal and provides a signal at junction 99 representative of acceleration. Potentiometer 100 scales the signal output from amplifier 96 in proportion to the mass of the mechanical linkage elements to provide a signal representative of the mechanical force or inertia of the simulator linkage. The output from wiper arm 102 is then fed to the summing amplifier for combination with other force signals developed. Resistor 104 and capacitor 106 are included in differentiation circuit 83 to reduce noise which occurs as a result of the differentiation process.

It can therefore be seen that the present invention provides a simple technique that eliminates the effect of mechanical inertia of simulator linkage elements which drive control members utilized by the trainee-pilot, and does so without losing mechanical strength, reliability, or system stability. This invention has been described in terms of a control loading system employed in an aircraft simulator, and in particular, in terms of a pilot's control stick. However, it will be readily apparent to those skilled in the art that this invention can be practiced in any simulation condition where a control loading feedback loop is hindered by mechanical inertia. It will also be apparent to those skilled in the art that various changes and modifications may be made without departing from the invention. For instance, an accelerometer could be mounted upon the mechanical linkage to sense the linkage acceleration instead of using a potentiometer and double differentiating. Also, other electronics differentiating circuits can readily be employed. The invention is, therefore, intended to cover all such changes and modifications as defined by the appended claims.

We claim:

1. In a simulator control loading system which includes a control member, a control member actuator, linkage elements therebetween, a force cell for providing a control force signal substantially representative of the total forces on the control member and including the mechanical inertia effects of the linkage elements, command means for providing a command signal representative of desired control member forces for realistic control member performance simulation, and summing means for summing said control force signal and said command signal to produce a difference signal representative of their difference for use in deriving a drive signal for actuating the actuator to produce said desired control member forces in said control member, an improvement for canceling the effect of the mechanical inertia of the linkage elements, comprising the following additional apparatus:
   (a) sensing means connected to the linkage elements for producing a movement signal representative of their movement;
   (b) conversion means responsive to said sensing means for converting said movement signal into an inertial force signal representative of the linkage element inertial force portion of the total forces on the control member;
   (c) combining means for combining said inertial force signal with the control force signal such that said inertial force signal is subtracted from the control force signal from said force cell to thereby cancel the inertial effect of the linkage elements.

2. The apparatus of claim 1 wherein said movement signal is representative of position, and wherein said conversion means comprise:
   (a) a first differentiation circuit responsive to said movement signal for developing a signal representative of the velocity of said linkage elements;
   (b) a second differentiation circuit responsive to said signal representative of velocity, for developing a signal representative of the acceleration of said linkage elements; and
   (c) means to scale said acceleration signal in proportion to the mass of said linkage elements such that said inertial force signal is developed.

* * * * *